United States Patent [19]

Durst et al.

[11] Patent Number: 5,745,146
[45] Date of Patent: Apr. 28, 1998

[54] DYNAMIC STROBE COMPENSATION CONTROL FOR A BARCODE PRINTER

[75] Inventors: William B. Durst, Lebanon; Robert B. Schulte, Springboro; Mitchell G. Stern, Centerville, all of Ohio

[73] Assignee: Monarch Marking Systems, Inc., Dayton, Ohio

[21] Appl. No.: 196,709

[22] Filed: Feb. 15, 1994

[51] Int. Cl.$^6$ .............................. B41J 2/35; B41J 2/355; B41J 2/37; B41J 2/36
[52] U.S. Cl. .............................. 347/192; 347/194
[58] Field of Search .............................. 400/120.09, 120.1, 400/120.11, 120.12, 120.14; 347/188, 189, 190, 191, 192, 194

[56] References Cited

U.S. PATENT DOCUMENTS

| | | | |
|---|---|---|---|
| 4,113,391 | 9/1978 | Minowa | 347/192 |
| 4,168,421 | 9/1979 | Ito | 347/192 |
| 4,268,838 | 5/1981 | Nakano et al. | 347/192 |
| 4,407,003 | 9/1983 | Fukui | 347/192 |
| 4,442,342 | 4/1984 | Yoneda | 347/192 |
| 4,510,505 | 4/1985 | Fukui | 347/192 |
| 4,514,737 | 4/1985 | Suzuki | 347/192 |
| 4,590,485 | 5/1986 | Uramoto | 347/192 |
| 4,642,657 | 2/1987 | Asakura | 347/192 |
| 4,684,959 | 8/1987 | Mori et al. | 347/192 |
| 5,053,790 | 10/1991 | Stephenson et al. | 347/192 |
| 5,087,923 | 2/1992 | Bruch | 347/192 |
| 5,191,356 | 3/1993 | Shibamiya | |
| 5,524,993 | 6/1996 | Durst | 400/120.14 |

FOREIGN PATENT DOCUMENTS

| | | |
|---|---|---|
| 0 458 507 A2 | 11/1991 | European Pat. Off. |
| 2 692 839 | 6/1992 | France . |
| 40 03 595 A1 | 8/1991 | Germany . |
| 44 38 600 A1 | 5/1995 | Germany . |
| 2 138 190 | 10/1984 | United Kingdom . |

*Primary Examiner*—Huan H. Tran
*Attorney, Agent, or Firm*—McAndrews, Held & Malloy, Ltd.

[57] ABSTRACT

A dynamic strobe compensation control for a battery powered barcode printer varies the strobe time for the thermal printhead of the printer during the printing of a line of data to compensate for internal resistance losses in the thermal printhead. The control varies the strobe time based upon the measured voltage of the battery powering the printhead when the battery is not loaded by the thermal printhead and when the battery is load by the thermal printhead. The print quality is thus maintained across the width of a line of print data as well as over multiple lines of print data.

25 Claims, 4 Drawing Sheets

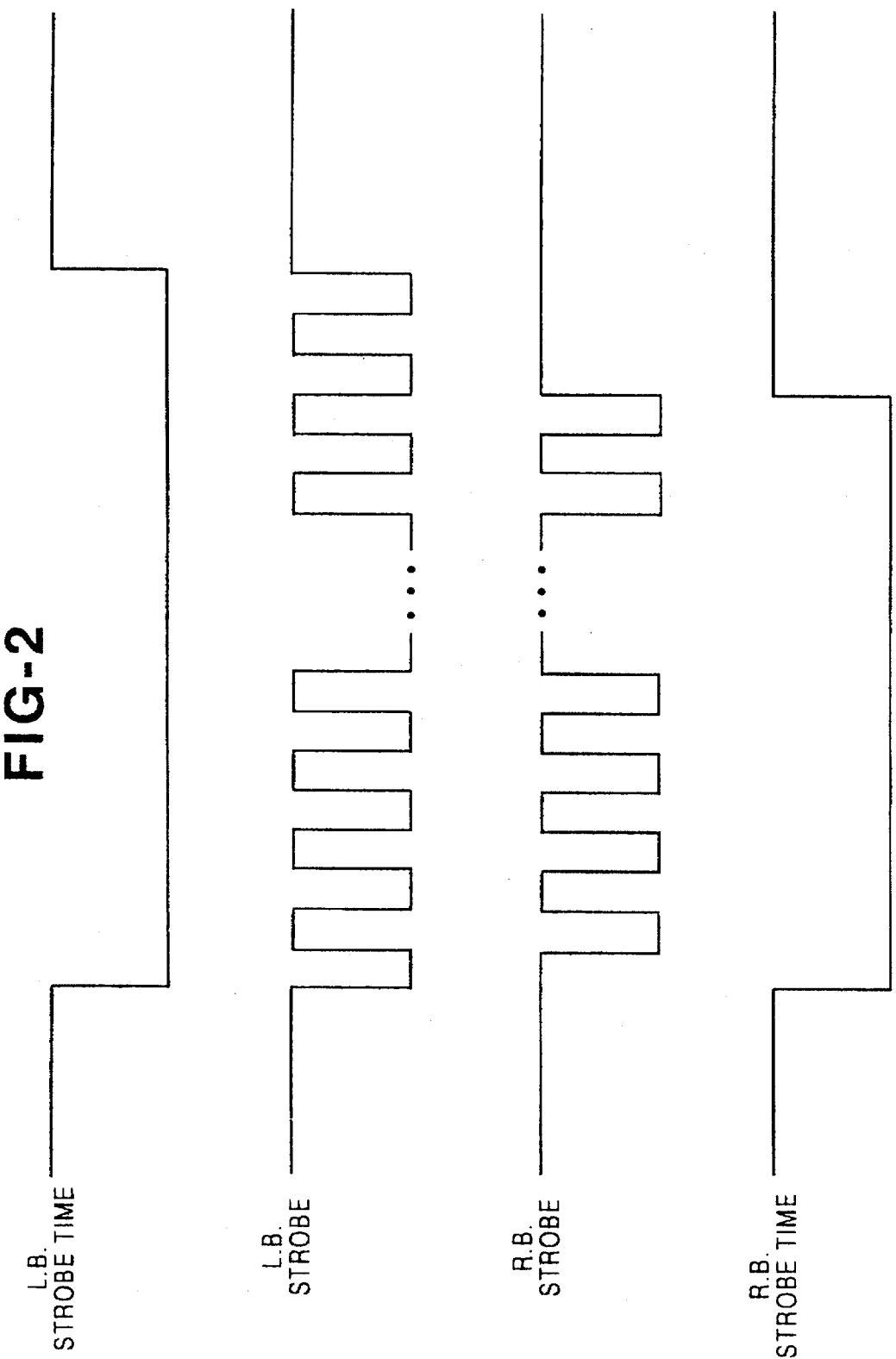

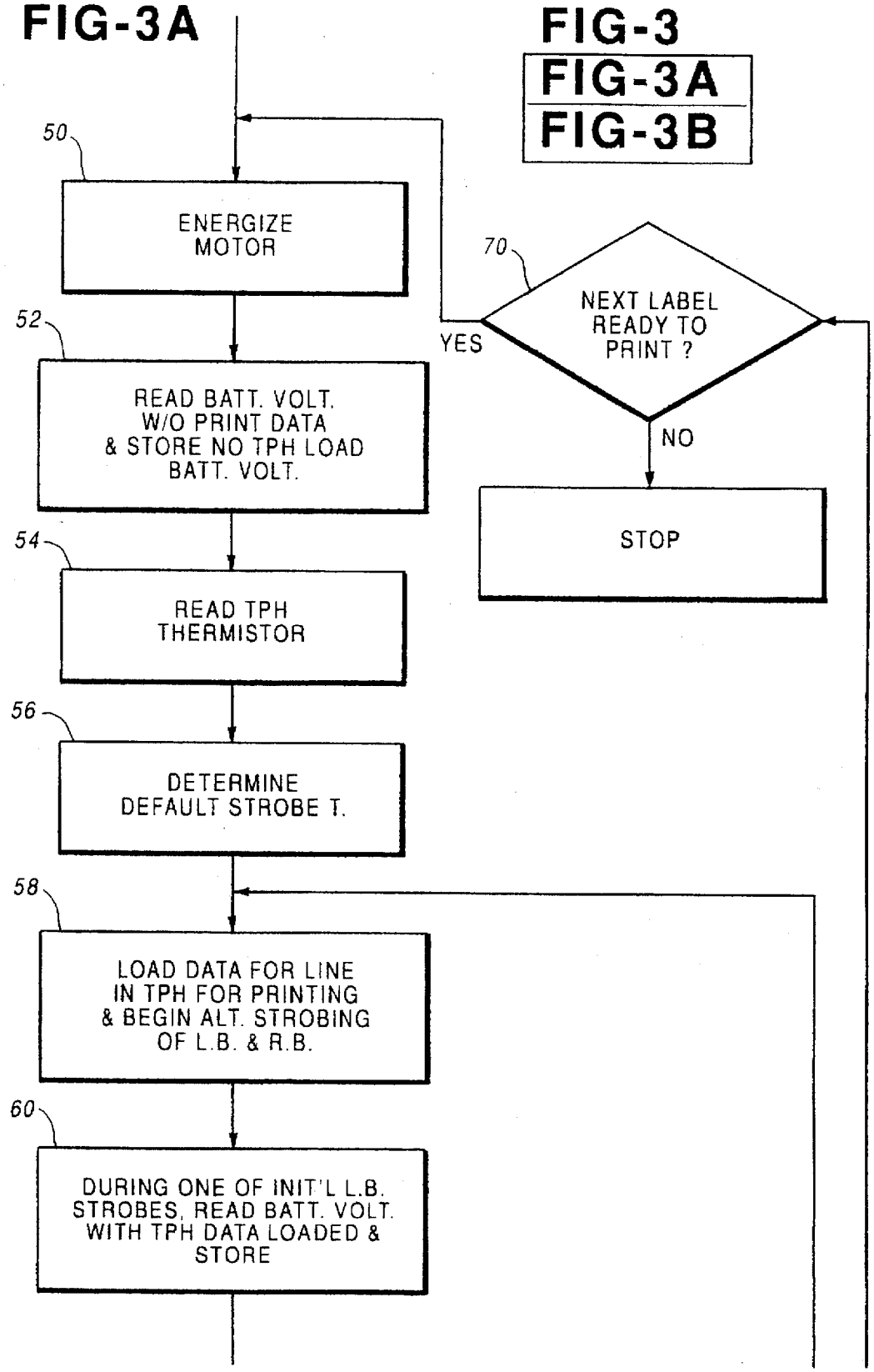

DYNAMIC STROBE COMPENSATION CONTROL FOR A BARCODE PRINTER

TECHNICAL FIELD

The present invention is directed to a dynamic strobe compensation control and method for a battery powered barcode printer that prints on tags, labels and the like; and more particularly to such a control and method that dynamically varies the strobe time for the thermal printhead of the barcode printer during the printing of a line of data to compensate for internal resistance losses in the thermal printhead without effecting imaging time.

BACKGROUND OF THE INVENTION

Barcode printers are known that are battery powered and include a thermal printhead. It has been found that internal resistance losses in the thermal printhead can result in a significant degradation in print quality, particularly when the printer is operating at low voltages. As the number of print elements turned on to print a given line of data increases, the voltage drop caused by the internal resistance loss in the thermal printhead increases. When the thermal printhead includes two or more banks of print elements, if the number of print elements that are on for one bank is significantly greater than the number of print elements that are on for a different bank, the variation in print quality across a single print line is particularly noticable.

Printhead controls are known to control the energy applied to the printhead based upon the energization history of the print elements surrounding a particular aimed at element for which the energy level is to be determined by decreasing the energy in response to a history of increasing numbers of surrounding print elements being energized. However, these controls do not address the problem of the voltage drop caused by internal resistance losses in the thermal printhead. Examples of such controls are described in U.S. Pat. Nos. 4,567,488 and 4,685,069. Another control in which the energy applied to the thermal printhead decreases as the number of previously printed bars in a serial bar code increases is shown in U.S. Pat. No. 4,400,058.

U.S. Pat. No. 4,573,058 discloses a system for automatically detecting a change in the average printhead resistance due to continued usage of the printhead and for automatically correcting for such resistance change in order to maintain constant printing energy. This control system is directed to a different problem than the present invention. More particularly, as described therein, the U.S. Pat. No. 4,573,058 is concerned with the change in the resistance of a given printhead element as a function of the number of times electrical current is passed through the element, due to thermal oxidation of the resistor layer. In order to overcome this problem, the control described in this patent requires two distinct modes of operation. One mode of operation is a print mode in which the printhead is energized by control signals and a voltage regulator to print data. Whereas, the other mode of operation is a test mode in which the voltage regulator is turned off and a constant current regulator is employed to measure the resistance of each individual print element of the printhead. The measured resistance values are then averaged to determine the average element resistance. The calculated average element resistance is compared to an initial measured and calculated average element resistance and in response thereto, the burn time duration and/or head voltage amplitude are controlled. This control is very complex. More importantly, the test mode and thus the compensation scheme cannot be performed during the printing of a single line of data itself. Therefore, this is not a dynamic compensation scheme that can compensate for internal resistance losses in the printhead due to variations in the number of print elements that are energized to print a given line of data.

SUMMARY OF THE INVENTION

In accordance with the present invention, the disadvantages of prior battery powered barcode printers have been overcome. The barcode printer of the present invention automatically and dynamically adjusts the strobe time for the thermal printhead of the barcode printer during the printing of a single line of data to compensate for internal resistance losses associated with the number of print elements that are energized to print that given line of data. Further, for thermal printheads that include more than one bank of print elements, the strobe time for each bank of elements is independently controlled so as to minimize variations in the print quality across a single line of print data.

More particularly, the barcode printer of the present invention includes a thermal printhead that is responsive to print data loaded therein and the energization of the printhead for printing on a web of record members such as tags, labels and the like. The voltage of the battery powering the barcode printer is monitored to provide a value that is representative of the internal resistance losses of the printhead during printing. Specifically, a no-printhead load battery voltage value representing the voltage of the battery prior to the energization of the thermal printhead is determined. Thereafter, the control determines a printhead loaded battery voltage value representing the voltage of the battery during the initial energization of the thermal printhead for printing a given line of data. While that given line of data is being printed, the control compares the no-printhead load battery voltage to the printhead loaded battery voltage value to increase the length of time that the thermal printhead is energized to print that given line of data in response to a difference between the determined battery voltage values.

If the thermal printhead employs more than one bank of print elements, during the initial energization of each of the banks, a printhead loaded battery voltage value is determined for the bank so as to enable the energization time or strobe time of each of the banks of print elements to be independently determined and controlled. Because the energization time or strobe time of the print element banks are individually controlled, the print quality across the entire line of print data is maintained.

In accordance with one aspect of the present invention, the strobe time for the thermal printhead is adjusted for each line of data to be printed so that as the number of print elements energized to print varies from line to line, the strobe time of the thermal printhead can be dynamically adjusted. These and other objects, advantages and novel features of the present invention, as well as details of an illustrated embodiment thereof, will be more fully understood from the following description and from the drawing.

BRIEF DESCRIPTION OF THE DRAWING

FIG. 2 is a timing diagram illustrating strobe times and strobe signals for a thermal printhead having two banks of print elements as depicted in FIG. 1; and FIG. 3 comprising FIGS. 3A, 3B is a flow chart illustrating the dynamic strobe compensation control software routine implemented by the barcode printer depicted in FIG. 1.

DESCRIPTION OF THE PREFERRED EMBODIMENT

Figure 1:
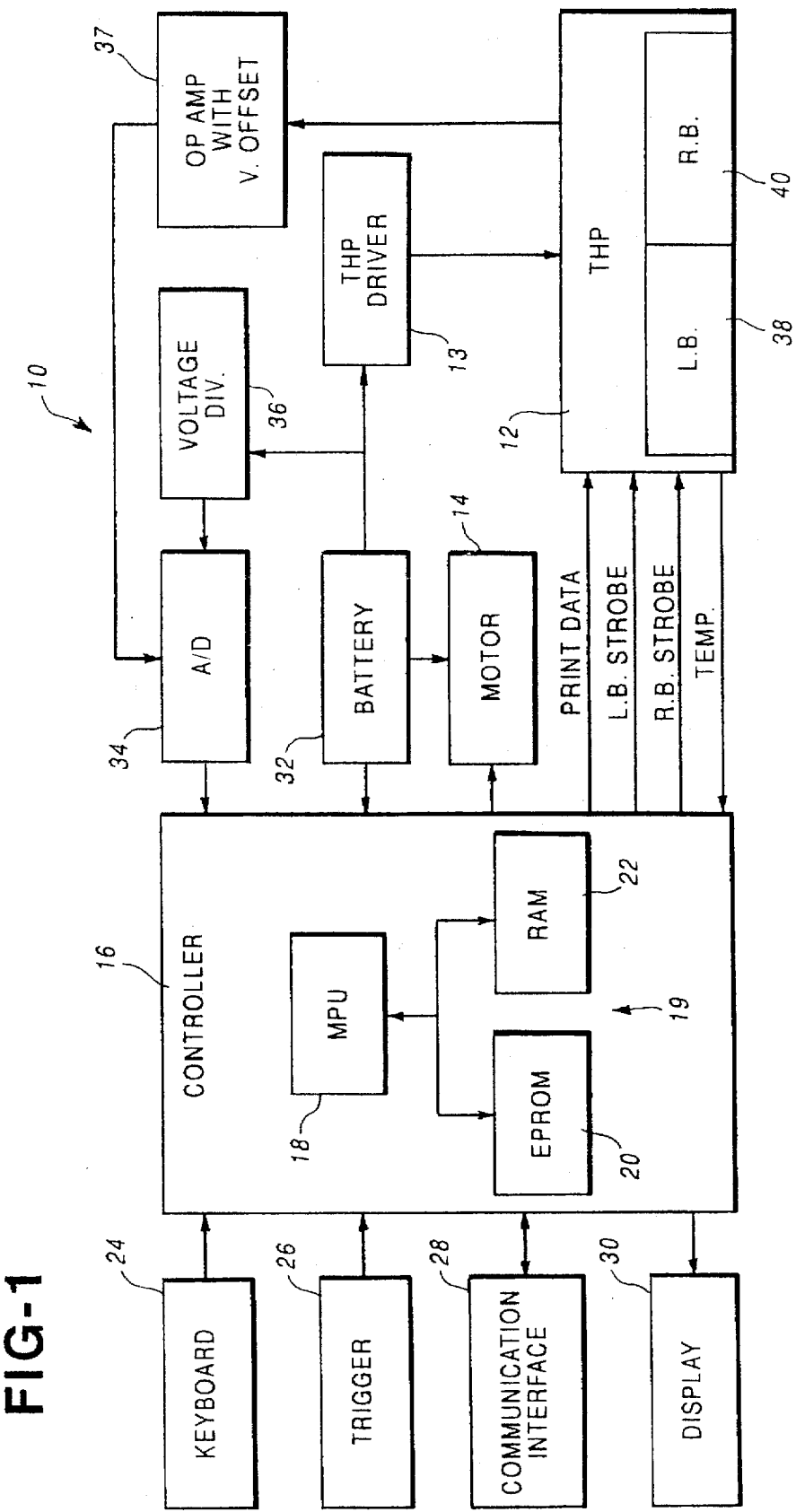
FIG. 1 is a block diagram of a barcode printer with the dynamic strobe compensation control of the present invention.

A barcode printer 10 in accordance with the present invention and as shown in FIG. 1 includes a thermal printhead 12 for printing barcodes and alphanumeric information on a web of record members such as tag, labels or the like. The supply of the web of record members may be of the direct printing type such that the record members include paper coated with a thermally responsive material. Alternatively, the supply used with the barcode printer 10 may be of the transfer type wherein a carbon ribbon is heat activated by the printhead 12 so as to print on the record members. The printhead 12 is strobed to control the amount of energy applied thereto for printing. More particularly, and as discussed in greater detail below, current is applied via a printhead driver 13 to the printhead 12 during a strobe time in order to print one line of data on a record member.

The barcode printer 10 also includes a motor 14 that is driven to advance the web of record members past the printhead 12 for printing. The motor 14 may be a stepper motor that is responsive to a periodic drive signal to advance the web, the drive signal controlling the speed of the stepper motor 14 which in turn controls the print speed of the barcode printer 10.

A controller 16 includes a microprocessor 18 or the like which operates in accordance with software routines stored in a memory 19 so as to control the operations of the barcode printer 10. The memory 19 may include for example an EPROM 20 and a RAM 22. The controller 16 is responsive to print data entered by a user via a keyboard 24 or entered from a host computer via a communication interface 28 to control the thermal printhead 12 to print the desired data. The controller 16 may be responsive to the manual actuation of a trigger key 26 or to an on-line print command received via the communication interface 28 so as to initiate the printing operation. If desired, the barcode printer 10 may include a display 30 to provide messages to the user.

The barcode printer 10 is powered by a battery 32. The dynamic strobe compensation scheme of the present invention monitors the voltage of the battery 32 when it is not loaded by the thermal printhead 12 and when it is loaded by the thermal printhead 12 during the printing of a line of data so as to control the energization time of the thermal printhead 12 to compensate for internal resistance losses due to the energization of the print elements of the printhead. The measured voltage of the battery 32 is coupled to the controller 16 through an analog to digital converter 34. Because the level of the battery voltage necessary to power the motor 14 and the thermal printhead 12 is typically outside the range of the analog to digital converter 34, a voltage divider 36 is employed to provide a reduced voltage value that is representative of the voltage of the battery 32. Further, an operational amplifier 37 with voltage offset is provided in a feedback loop from the printhead 12 and the analog to digital converter 34 for high resolution operation thereof.

The thermal printhead 12 may include a single bank of print elements or multiple banks of print elements. As depicted in FIG. 1, the thermal printhead 12 is illustrated having two banks of print elements, a left bank 38 and a right bank 40. The left bank 38 and right bank 40 of print elements are alternately energized a number times during the printing of one line of data. More particularly, the left bank 38 is responsive to a left bank strobe signal having a dynamically determined left bank strobe time to print a line corresponding to the data loaded into the left bank of the thermal printhead 12. Similarly, the right bank 40 is responsive to a right bank strobe signal having a dynamically determined right bank strobe time to print the data loaded into the right bank of the thermal printhead 12. As shown in FIG. 2, the left bank strobe signal is applied to the left bank 38 of the printhead 12 during an energization period corresponding to the length of the left bank strobe time. Similarly, the right bank 40 is energized by the right bank strobe signal during the energization period corresponding to the length of the right bank strobe time. The right bank strobe signal is the inverse of the left bank strobe signal so that the banks are alternatingly pulsed as shown in FIG. 2. However, the length of the left bank strobe signal and the length of the right bank strobe signal are independently determined according to the dynamic strobe compensation control of the present invention so as to maintain uniform print quality across the entire width of each line of print on a record member.

Figure 3B:
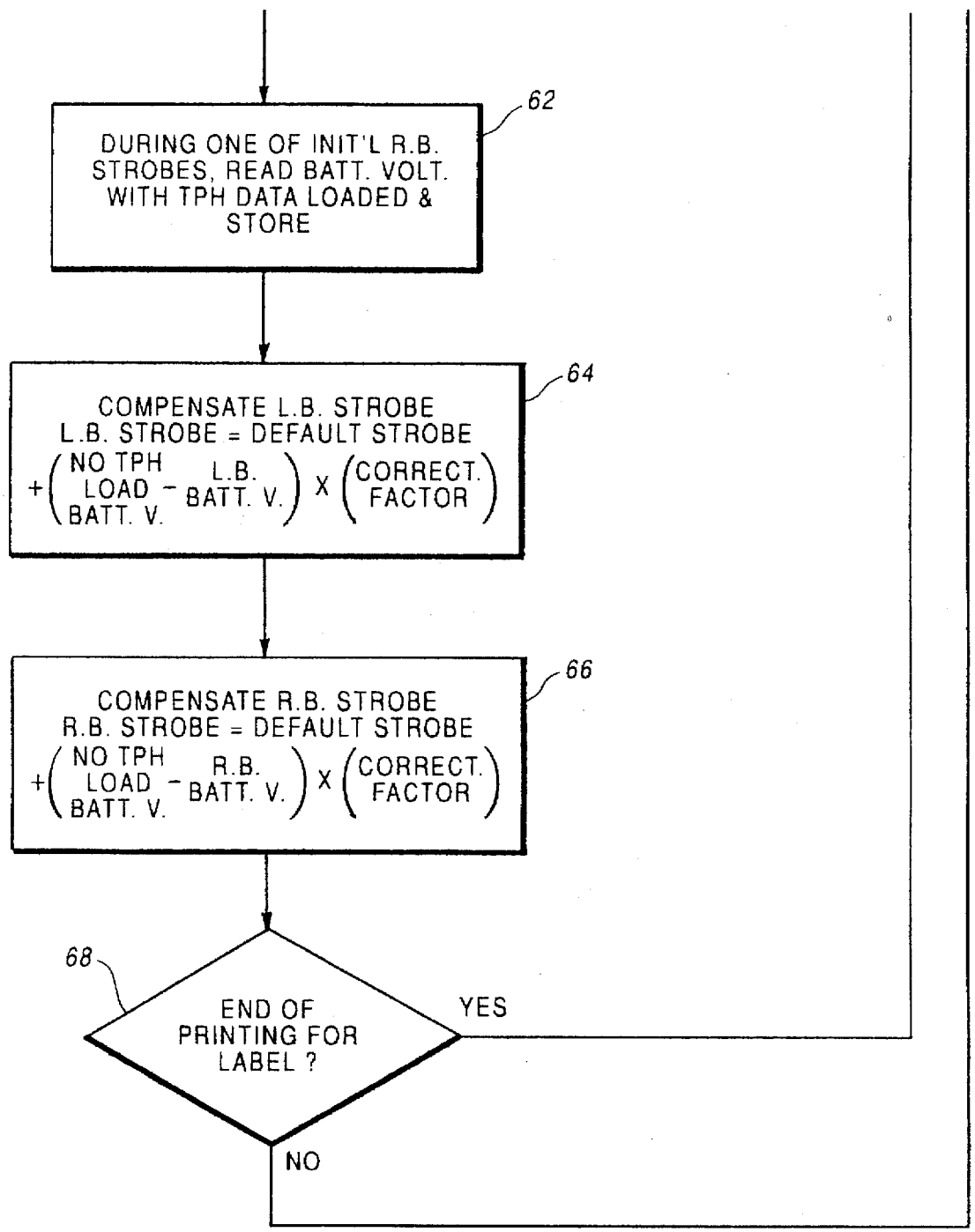

The energization times, i.e. strobe times, of the left bank 38 and the right bank 40 of the printhead 12 are determined in accordance with the dynamic strobe compensation control software routine depicted in FIG. 3. When the barcode printer 10 is ready to print a label, the microprocessor 18 at a block 50 energizes the motor 14. Thereafter, the microprocessor 18 at a block 52 reads a value received from the analog to digital convertor 34 representing the voltage of the battery 32 without the thermal printhead 12 being energized to provide a no-printhead load battery voltage value which is stored in the RAM 22 and used as a reference for compensating the strobe signals during the printing of each line of data on a given tag or label. Thereafter, the microprocessor 18 reads a value representing the sensed temperature of the thermal printhead 12. The temperature value is received from a thermistor that is mounted on a heat sink of the thermal printhead 12. At a block 56, the microprocessor 18 determines a default strobe time to be used to print each of the lines of data on the label, the default strobe time being individually compensated for each bank of the printhead 12 as discussed below. The default strobe time may be determined at block 56 as described in a co-pending patent application entitled Automatic Print Speed Control for a Barcode Printer assigned U.S. patent application Ser. No. 08/132,656, filed Oct. 6, 1993 and assigned to the assignee of the present invention, which application is incorporated herein by reference. As described in more detail in that application, when power for the barcode printer 10 is turned on, the microprocessor 18 measures the resistance of the printhead 12. The microprocessor utilizes the measured printhead resistance as well as a measured contrast setting, printhead heat sink temperature and the no-printhead load battery voltage to calculate the default strobe time.

In accordance with one embodiment of the present invention, the dynamic strobe compensation scheme depicted in FIG. 3 compensates for resistance losses in the thermal printhead 12 due to the number of print elements that are energized to print a given line of data during the printing of that line. In order to do so, the microprocessor 18 at a block 58 loads the data for one print line in the thermal printhead 12 for printing and begins the alternate strobing of the left bank and the right bank via the left bank strobe signal and the right bank strobe signal. During the initial portion of the left bank strobe signal, the length of which is initially set to the length of the default strobe time, and while the left bank is being energized to print, the microprocessor 18 at block 60 reads the voltage of the battery 32 with the printhead data being loaded in the printhead 12 so as to provide a printhead loaded battery voltage value. This printhead loaded battery voltage value for the left bank is also stored in the RAM 22 at block 60. Similarly, during the initial portion of the right bank strobe signal while the right bank is energized to print the microprocessor 18 at block 62 reads the voltage of the battery 32 with the print data loaded in the printhead 12 and the printhead 12 printing to provide a printhead loaded battery voltage for the right bank, this value being stored in the RAM 22. At block 64, the microprocessor 18 compensates the default strobe time based on the left bank printhead loaded battery voltage so as to determine the length of the left bank strobe signal during the printing of the line of data. More particularly, the microprocessor 18 sets the length of the left bank strobe signal equal to the length of the default strobe value determined at block 56 plus the product of a correction factor multiplied by the difference between the no-printhead load battery voltage value determined for the label at block 52 and the left bank printhead loaded battery voltage value determined for the print line at block 60. Similarly, the microprocessor 18 compensates the default strobe time determined at block 56 utilizing the right bank printhead loaded battery voltage determined at block 62 to compensate the default strobe time and thereby generate the right bank strobe signal. As discussed for the left bank, the length of the right bank strobe signal is set equal to the length of the default strobe time plus the product of a correction factor times the difference between the no-printhead load battery voltage value determined at block 52 and the right bank loaded battery voltage value determined for the individual print line at block 62. From the above, it is seen that initially during the printing of a given line of data, the length of the strobe signals to be applied to the left bank and right bank of the printhead 12 are set equal to the default strobe time; but during the printing of that same line of data, the strobe signals for the left bank and right bank are dynamically and independently varied in accordance with measured battery voltages. Because the battery voltages measured when the printhead 12 is loading the battery vary in accordance with the internal resistance losses due to the number of print elements that are energized at a given time in the respective left bank and right banks, the dynamic strobe compensation scheme of the present invention dynamically compensates for internal resistance losses in the thermal printhead 12 dynamically during the printing of each individual line. Therefore, not only is the print quality maintained from line to line across the length of the print data contained on a label; but the print quality is maintained across the width of a line so that there is not a noticable difference in the print quality of the data printed by the left bank and the right bank.

It is noted that the present invention is not limited to thermal printheads having two banks of print elements but is applicable to printheads having one bank of elements as well as printheads having many banks of print elements. Further, the present invention is not limited for use with a barcode printer having a stepper motor. Many modifications and variations of the present invention are possible in light of the above teachings. For example, although a combination hardware and software embodiment of the present invention is depicted in the drawings, the present invention may be implemented essentially in software alone. For example, the controller 16 may count or otherwise keep track of the number of print elements to be energized to print a given line of data by examining the print data stored in the RAM 22. Based upon the number of print elements in, for example the left bank, to be energized to print a given line, the microprocessor can calculate the expected voltage drop corresponding to the energization of that number of print elements. From the calculated voltage drop, the microprocessor 18 can then compensate the default strobe time to generate the left bank strobe signal as discussed above with respect to block 64. The right bank strobe signal can be similarly determined. Many other modifications of the present invention can be made without departing from the above teachings. Thus, it is to be understood, that within the scope of the appended claims the invention may be practiced otherwise than as described herein above.

What is claimed and desired to be secured by Letters Patent is:

1. A barcode printer powered by a battery having a battery voltage, said barcode printer comprising:
   a thermal printhead energizable for printing on a web of record members;
   a controller for loading data into said thermal printhead and for energizing said thermal printhead during an energization time having an initial energization period;
   means for determining the voltage of said battery, said determining means providing a first battery voltage value representative of the battery voltage prior to the energization time of said thermal printhead and said determining means providing a second battery voltage value representative of the battery voltage during the initial energization period of said thermal printhead for printing a line of data loaded into said thermal printhead; and
   means for comparing said first battery voltage value to said second battery voltage value to vary the length of time said thermal printhead is energized to print said line of data in response to a difference between said first and second battery voltage values to dynamically adjust the energization time of said thermal printhead during the printing of a line.

2. A battery powered barcode printer as recited in claim 1 wherein the difference between said first and second battery voltage values represents internal resistance losses due to the energization of said printhead to print said line of data.

3. A battery powered barcode printer as recited in claim 1 wherein said thermal printhead includes a plurality of groups of print elements each of said groups individually energized to print a portion of said line of data.

4. A battery powered barcode printer as recited in claim 3 wherein said determining means provides a second battery voltage value for each of said groups of print elements representative of the battery voltage during the initial energization period of said group for printing a portion of said line and said comparing means compares the second battery voltage value for each of said groups to said first battery voltage value to independently adjust the length of time each of said groups of print elements is energized to print its respective line portion.

5. A barcode printer powered by a battery having a battery voltage, said barcode printer comprising:
   a thermal printhead energizable for printing a line of data on a web of record members;
   a motor powered by said battery for driving said web of record members pass said thermal printhead for printing thereon;
   means for energizing said motor;
   means for energizing said thermal printheads;
   means responsive to the energization of said motor and prior to the energization of said thermal printhead for determining a no-printhead load battery voltage value representing the voltage of said battery without a load thereon from said printhead printing;
   means for determining a printhead loaded battery voltage value representing the voltage of said battery while said printhead is energized to print a line of data; and means for comparing said no-printhead load battery voltage value to said printhead loaded battery voltage value to increase the length of time said thermal printhead is energized to print said line of data in response to a difference between said battery voltage values.

6. A battery powered barcode printer as recited in claim 5 wherein the difference between said no-printhead load battery voltage value and said printhead loaded battery voltage value represents internal resistance losses due to the energization of said printhead to print said line of data.

7. A battery powered barcode printer as recited in claim 5 wherein said thermal printhead includes a plurality of groups of print elements each of said groups individually energized to print a portion of said line of data.

8. A battery powered barcode printer as recited in claim 7 wherein said determining means provides a printhead loaded battery voltage value for each of said groups of print elements representative of the battery voltage during the initial energization period of said group for printing a portion of said line and said comparing means compares the printhead loaded battery voltage value for each of said groups to said no-printhead load battery voltage to independently adjust the length of time each of said groups of print elements is energized to print its respective line portion.

9. A barcode printer powered by a battery having a battery voltage, said barcode printer having a dynamic printhead strobe time compensation control comprising:
- a thermal printhead having a number of print elements that are energizable during a strobe time in accordance with print data to print a line of data on a web of record members;
- a memory for storing a reference value representing said battery voltage without said thermal printhead creating a load on said battery;
- means for determining during an energization period of said thermal printhead a resistance loss value based upon said battery voltage during said energization period, said resistance loss value representing the internal resistance loss of said thermal printhead due to the number of print elements energized to print a given line of data; and
- means for determining the length of said strobe time for printing said given line of data by comparing said resistance loss value determined for said line to said reference value, said strobe time length generally increasing with increasing numbers of print elements to be energized.

10. A battery powered barcode printer as recited in claim 9 wherein said resistance loss value determining means includes means for determining the voltage of said battery powering said printer.

11. A battery powered barcode printer as recited in claim 9 wherein said means for determining the length of said strobe time determines the length of said strobe time for printing said given line of data during the printing of said given line.

12. A battery powered barcode printer as recited in claim 9 wherein said means for determining a resistance loss value includes means for counting the number of print elements energized to print a given line of data.

13. A battery barcode printer as recited in claim 9 wherein said means for determining a resistance loss value includes means for determining a value representing the voltage of said battery with said thermal printhead printing a line of data.

14. A battery powered barcode printer as recited in claim 9 including means for determining a reference value for each of said record members on which one or more lines of data are printed.

15. A battery powered barcode printer as recited in claim 14 wherein said reference value determining means determines a value representing the voltage of said battery powering said printer without said thermal printhead printing creating a load.

16. A battery powered barcode printer as recited in claim 9 for printing on a web of record members wherein said dynamic printhead strobe time compensation control dynamically determines a strobe time for each line of data printed on a record member.

17. A battery powered barcode printer having a dynamic printhead strobe time compensation control comprising:
- a thermal printhead having a first bank with a number of print elements energizable during a first bank strobe time and a second bank with a number of print elements energizable during a second bank strobe time, said banks of print elements printing a line of data in accordance with print data loaded therein during an energization of said banks;
- resistance loss value determining means for determining a first bank value representative of an internal resistance loss of said thermal printhead due to the number of print elements in said first bank energized to print one portion of a given line of data, said determining means determining a second bank value representative of an internal resistance loss of said thermal printhead due to the number of print elements in said second bank energized to print another portion of said given line of data; and
- strobe time determining means for determining the length of said first bank strobe time for printing said one portion of said given line based upon said first bank resistance loss value, said strobe time determining means determining the length of said second bank strobe time for printing said other portion of said given line based upon said second bank resistance loss value.

18. A battery powered barcode printer as recited in claim 17 wherein said resistance loss value determining means includes means for determining the voltage of said battery powering said printer.

19. A battery powered barcode printer as recited in claim 17 wherein said strobe time determining means determines the lengths of said first and second strobe times during the printing of said given line.

20. A battery powered barcode printer having a dynamic printhead strobe time compensation control comprising:
- a thermal printhead having a first bank with a number of print elements energizable during a first bank strobe time and a second bank with a number of print elements energizable during a second bank strobe time, said banks of print elements printing a line of data in accordance with print data loaded therein during an energization of said banks;
- resistance loss value determining means for determining a first bank value representative of an internal resistance loss of said thermal printhead due to the number of print elements in said first bank energized to print one portion of a given line of data, said determining means determining a second bank value representative of an internal resistance loss of said thermal printhead due to the number of print elements in said second bank energized to print another portion of said given line of data, wherein said resistance loss value determining means includes means for determining a value representing the voltage of said battery powering said printer without said thermal printhead printing creating a load on said battery and means for determining a value representing the voltage of said battery with said first bank energized to print and means for determining a value representing the voltage of said battery with said second bank energized to print; and strobe time determining means for determining the length of said first bank strobe time for printing said one portion of said given line based upon said first bank resistance loss value, said strobe time determining means determining the length of said second bank strobe time for printing said other portion of said given line based upon said second bank resistance loss value.

21. A method for dynamically adjusting the length of a printhead strobe signal in a barcode printer having a thermal printhead with at least one bank with a number of print elements and powered by a battery having a battery voltage, comprising:

storing a reference value representing said battery voltage without said thermal printhead creating a load on said battery;

determining during an energization period of said thermal printhead a resistance loss value based upon said battery voltage during said energization period, said resistance loss value representing an internal resistance loss of said thermal printhead due to the number of print elements of said bank energized to print at least a portion of a given line of data; and determining the length of a strobe signal associated with said bank of print elements for printing at least said portion of said line of comparing said resistance loss value determined for said portion of the line to said reference value, wherein the length of said strobe signal generally increases with increasing numbers of print elements in said bank energized to print.

22. A method for dynamically adjusting the length of a printhead strobe signal as recited in claim 21 wherein said printhead includes a plurality of banks of print elements and said step of determining the length of a strobe signal includes determining an individual strobe signal length for each of said banks.

23. A method for dynamically adjusting the length of a printhead strobe signal in a barcode printer powered by a battery having a battery voltage, said printer having a thermal printhead with at least one bank of print elements comprising:

determining the voltage of said battery prior to an energization of said thermal printhead to provide a first battery voltage value;

determining the voltage of said battery during an initial energization of said thermal printhead for printing a line of data loaded into said thermal printhead to provide a second battery voltage value; and comparing said first battery voltage value to said second battery voltage value to vary a length of time said thermal printhead is energized to print said line of data in response to a difference between said first and second battery voltage values to dynamically adjust the energization time of said thermal printhead during the printing of a line.

24. A method of dynamically adjusting an energization time of a thermal printhead in a barcode printer powered by a battery having a battery voltage and a controller for loading data into the thermal printhead and for energizing the thermal printhead during an energization time having an initial energization period, comprising:

determining the voltage of said battery prior to the energization time of said thermal printhead to provide a first battery voltage value;

loading data into said thermal printhead;

energizing said thermal printhead;

determining, during said initial energization period of said thermal printhead for printing said line of data loaded into said thermal printhead, a second battery voltage;

comparing said first battery voltage value to said second battery voltage value to determine a difference between said first and second battery voltage values;

adjusting the length of time said thermal printhead is energized to print said line of data in response to said difference between said first and second battery voltage values to dynamically adjust the energization time of said thermal printhead during the printing of a line.

25. A method of dynamically adjusting an energization time of a thermal printhead in a barcode printer powered by a battery having a battery voltage and a motor powered by the battery for driving a web of record members past the thermal printhead for printing thereon comprising:

energizing the motor;

determining a no-printhead load battery voltage value representing the voltage of the battery without a load thereon from said printhead printing;

energizing said thermal printhead;

determining a printhead loaded battery voltage value representing the voltage of said battery while said printhead is energized to print a line of data; and comparing said no-printhead load battery voltage value to said printhead loaded battery voltage value to increase the length of time said thermal printhead is energized to print said line of data in response to a difference between said battery voltage values.

* * * * *